United States Patent
Yerramalli et al.

(10) Patent No.: US 10,727,986 B2
(45) Date of Patent: Jul. 28, 2020

(54) ROBUST ACKNOWLEDGEMENT RETRANSMISSION

(71) Applicant: QUALCOMM Incorporated, San Diego, CA (US)

(72) Inventors: Srinivas Yerramalli, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/181,141

(22) Filed: Nov. 5, 2018

(65) Prior Publication Data

US 2019/0140783 A1 May 9, 2019

Related U.S. Application Data

(60) Provisional application No. 62/581,906, filed on Nov. 6, 2017.

(51) Int. Cl.
| | |
|---|---|
| *H04L 1/18* | (2006.01) |
| *H04L 1/16* | (2006.01) |
| *H04L 5/00* | (2006.01) |
| *H04W 72/14* | (2009.01) |
| *H04L 1/12* | (2006.01) |

(52) U.S. Cl.
CPC .......... *H04L 1/1816* (2013.01); *H04L 1/1671* (2013.01); *H04L 1/1685* (2013.01); *H04L 1/1858* (2013.01); *H04L 5/0055* (2013.01); *H04W 72/14* (2013.01); *H04L 1/1614* (2013.01); *H04L 1/1822* (2013.01); *H04L 2001/125* (2013.01)

(58) Field of Classification Search
CPC combination set(s) only.
See application file for complete search history.

(56) References Cited

U.S. PATENT DOCUMENTS

| | | | |
|---|---|---|---|
| 2007/0064668 A1 | 3/2007 | Jiang et al. | |
| 2012/0230245 A1* | 9/2012 | Ostergaard | H04L 1/1893 370/315 |
| 2013/0329701 A1* | 12/2013 | Bajzec | H04W 84/18 370/336 |

(Continued)

FOREIGN PATENT DOCUMENTS

| | | |
|---|---|---|
| WO | 9815140 A1 | 4/1998 |
| WO | 2005083951 A1 | 9/2005 |
| WO | 2008135238 A1 | 11/2008 |

OTHER PUBLICATIONS

International Search Report and Written Opinion—PCT/US2018/059462—ISA/EPO—dated Feb. 18, 2019.

*Primary Examiner* — Michael J Moore, Jr.

(57) ABSTRACT

Methods, systems, and devices for wireless communication are described. A user equipment (UE) may receive a transport block (TB) of data from a network, decode the TB of data, transmit to the network a first acknowledgement based on a result of the decoding, receive a signal from the network that includes an acknowledgement retransmission request and a TB indication that indicates a TB of data to which the acknowledgement retransmission request relates, determine a second acknowledgement based on the acknowledgement retransmission request and the TB indication, and transmit the second acknowledgement to the network.

8 Claims, 17 Drawing Sheets

(56) References Cited

U.S. PATENT DOCUMENTS

| | | | |
|---|---|---|---|
| 2014/0204893 A1* | 7/2014 | Horiuchi | H04L 1/1896 |
| | | | 370/329 |
| 2015/0327295 A1* | 11/2015 | Yang | H04L 1/1854 |
| | | | 370/337 |
| 2019/0199479 A1* | 6/2019 | Lin | H04W 72/042 |
| 2020/0036485 A1* | 1/2020 | Froberg Olsson | H04L 5/0055 |
| 2020/0112403 A1* | 4/2020 | Liu | H04L 1/1812 |

\* cited by examiner

US 10,727,986 B2

ROBUST ACKNOWLEDGEMENT RETRANSMISSION

RELATED APPLICATIONS

This application claims priority to U.S. Provisional Application No. 62/581,906, titled "ROBUST ACKNOWLEDGEMENT RETRANSMISSION," filed Nov. 6, 2017, the entire contents of which are incorporated herein by reference.

BACKGROUND

Field of the Disclosure

The following relates generally to wireless communication, and more specifically to designs for robust acknowledgement retransmissions.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems employ a hybrid automatic repeat request (HARQ) mechanism to improve communications between a base station and a UE. In one example, HARQ operations include a base station transmitting a downlink (DL) grant and data to a UE, and the UE sending an acknowledgement (e.g., either a positive acknowledgement (ACK) or a negative acknowledgement (NAK)) to the base station that indicates whether the UE was successful at decoding the data it received. In some scenarios, however, the base station may not receive an ACK/NAK from the UE even though the base station expects to receive one. This scenario may correspond to various situations, such as: the DL grant was not received by the UE so the UE did not transmit an ACK/NAK, the UE transmitted an ACK/NAK but the signal quality (e.g., signal-to-interference-plus-noise-ratio (SINR)) was too low for the base station to receive the ACK/NAK, or, in shared spectrum (e.g., unlicensed) applications, the UE failed a listen-before-talk (LBT) attempt to transmit the ACK/NAK.

SUMMARY

The described techniques relate to improved methods, systems, devices, or apparatuses that support robust designs for acknowledgement (e.g., positive acknowledgement (ACK), negative acknowledgement (NAK)) retransmissions.

A method of wireless communication is described. The method may include receiving a transport block (TB) of data from a network, decoding the TB of data, transmitting to the network a first acknowledgement based on a result of the decoding, receiving a signal from the network that includes an acknowledgement retransmission request and a TB indication that indicates a TB of data to which the acknowledgement retransmission request relates, determining a second acknowledgement based on the acknowledgement retransmission request and the TB indication, and transmitting the second acknowledgement to the network.

An apparatus for wireless communication is described. The apparatus may include means for receiving a TB of data from a network, means for decoding the TB of data, means for transmitting to the network a first acknowledgement based on a result of the decoding, means for receiving a signal from the network that includes an acknowledgement retransmission request and a TB indication that indicates a TB of data to which the acknowledgement retransmission request relates, means for determining a second acknowledgement based on the acknowledgement retransmission request and the TB indication, and means for transmitting the second acknowledgement to the network.

Another apparatus for wireless communication is described. The apparatus may include a processor, memory coupled to the processor, and instructions stored in the memory. The instructions may be executable by the processor to cause the apparatus to receive a TB of data from a network, decode the TB of data, transmit to the network a first acknowledgement based on a result of the decoding, receive a signal from the network that includes an acknowledgement retransmission request and a TB indication that indicates a TB of data to which the acknowledgement retransmission request relates, determine a second acknowledgement based on the acknowledgement retransmission request and the TB indication, and transmit the second acknowledgement to the network.

A non-transitory computer readable medium storing code for wireless communication is described. The code may include instructions executable by a processor to receive a TB of data from a network, decode the TB of data, transmit to the network a first acknowledgement based on a result of the decoding, receive a signal from the network that includes an acknowledgement retransmission request and a TB indication that indicates a TB of data to which the acknowledgement retransmission request relates, determine a second acknowledgement based on the acknowledgement retransmission request and the TB indication, and transmit the second acknowledgement to the network.

A method of wireless communication is described. The method may include transmitting to a user equipment (UE) a grant and a TB of data associated with the grant, transmitting a signal to the UE that includes an acknowledgement retransmission request and a TB indication related to the acknowledgement retransmission request, wherein the TB indication identifies the TB of data transmitted to the UE, and receiving an acknowledgement from the UE for the TB of data, the acknowledgement being associated with the acknowledgement retransmission request.

An apparatus for wireless communication is described. The apparatus may include means for transmitting to a UE a grant and a TB of data associated with the grant, means for transmitting a signal to the UE that includes an acknowledgement retransmission request and a TB indication related to the acknowledgement retransmission request, wherein the TB indication identifies the TB of data transmitted to the UE, and means for receiving an acknowledgement from the UE for the TB of data, the acknowledgement being associated with the acknowledgement retransmission request.

Another apparatus for wireless communication is described. The apparatus may include a processor, memory coupled to the processor, and instructions stored in the memory. The instructions may be executable by the processor to cause the apparatus to transmit to a UE a grant and a TB of data associated with the grant, transmit a signal to the UE that includes an acknowledgement retransmission request and a TB indication related to the acknowledgement retransmission request, wherein the TB indication identifies the TB of data transmitted to the UE, and receive an acknowledgement from the UE for the TB of data, the acknowledgement being associated with the acknowledgement retransmission request.

A non-transitory computer readable medium storing code for wireless communication is described. The code may include instructions executable by a processor to transmit to a UE a grant and a TB of data associated with the grant, transmit a signal to the UE that includes an acknowledgement retransmission request and a TB indication related to the acknowledgement retransmission request, wherein the TB indication identifies the TB of data transmitted to the UE, and receive an acknowledgement from the UE for the TB of data, the acknowledgement being associated with the acknowledgement retransmission request.

A method of wireless communication is described. The method may include receiving a TB of data from a network, decoding the TB of data, transmitting to the network a first acknowledgement based on a result of the decoding, receiving an acknowledgement retransmission request from the network, and transmitting to the network a signal that includes the first acknowledgement and a TB indication, wherein the TB indication indicates that the first acknowledgement is associated with the TB of data.

An apparatus for wireless communication is described. The apparatus may include means for receiving a TB of data from a network, means for decoding the TB of data, means for transmitting to the network a first acknowledgement based on a result of the decoding, means for receiving an acknowledgement retransmission request from the network, and means for transmitting to the network a signal that includes the first acknowledgement and a TB indication, wherein the TB indication indicates that the first acknowledgement is associated with the TB of data.

Another apparatus for wireless communication is described. The apparatus may include a processor, memory coupled to the processor, and instructions stored in the memory. The instructions may be executable by the processor to cause the apparatus to receive a TB of data from a network, decode the TB of data, transmit to the network a first acknowledgement based on a result of the decoding, receive an acknowledgement retransmission request from the network, and transmit to the network a signal that includes the first acknowledgement and a TB indication, wherein the TB indication indicates that the first acknowledgement is associated with the TB of data.

A non-transitory computer readable medium storing code for wireless communication is described. The code may include instructions executable by a processor to receive a TB of data from a network, decode the TB of data, transmit to the network a first acknowledgement based on a result of the decoding, receive an acknowledgement retransmission request from the network, and transmit to the network a signal that includes the first acknowledgement and a TB indication, wherein the TB indication indicates that the first acknowledgement is associated with the TB of data.

A method of wireless communication is described. The method may include transmitting to a UE a TB of data, transmitting to the UE an acknowledgement retransmission request for the TB of data, receiving a signal from the UE that includes an acknowledgement and a TB indication that indicates a TB of data to which the acknowledgement retransmission request relates, and determining whether the acknowledgement is related to the TB of data or a different TB of data based on the TB indication.

An apparatus for wireless communication is described. The apparatus may include means for transmitting to a UE a TB of data, means for transmitting to the UE an acknowledgement retransmission request for the TB of data, means for receiving a signal from the UE that includes an acknowledgement and a TB indication that indicates a TB of data to which the acknowledgement retransmission request relates, and means for determining whether the acknowledgement is related to the TB of data or a different TB of data based on the TB indication.

Another apparatus for wireless communication is described. The apparatus may include a processor, memory coupled to the processor, and instructions stored in the memory. The instructions may be executable by the processor to cause the apparatus to transmit to a UE a TB of data, transmit to the UE an acknowledgement retransmission request for the TB of data, receive a signal from the UE that includes an acknowledgement and a TB indication that indicates a TB of data to which the acknowledgement retransmission request relates, and determine whether the acknowledgement is related to the TB of data or a different TB of data based on the TB indication.

A non-transitory computer readable medium storing code for wireless communication is described. The code may include instructions executable by a processor to transmit to a UE a TB of data, transmit to the UE an acknowledgement retransmission request for the TB of data, receive a signal from the UE that includes an acknowledgement and a TB indication that indicates a TB of data to which the acknowledgement retransmission request relates, and determine whether the acknowledgement is related to the TB of data or a different TB of data based on the TB indication.

DETAILED DESCRIPTION

The described aspects of the disclosure relate to improved methods, systems, devices, or apparatuses that facilitate robust acknowledgement retransmissions. In some examples, the techniques described herein enable transport blocks (TBs) of data to be identified and associated with acknowledgement (positive acknowledgements (ACK), negative acknowledgements (NAK), generally referred to as "A/N" herein) retransmissions. In some examples, a base station may signal to a user equipment (UE) the TB of data to which an A/N retransmission request pertains. In other examples, when sending an A/N retransmission, a UE may signal to a base station the TB of data to which the A/N retransmission pertains. Various example techniques may enable base stations and/or UEs to more accurately identify when, and what, TBs of data are unsuccessfully communicated between base stations and UEs.

Aspects of the disclosure are initially described in the context of a wireless communications system. Aspects of the disclosure are further illustrated by and described with reference to apparatus diagrams, system diagrams, and flowcharts that relate to robust acknowledgement retransmissions.

Figure 1:
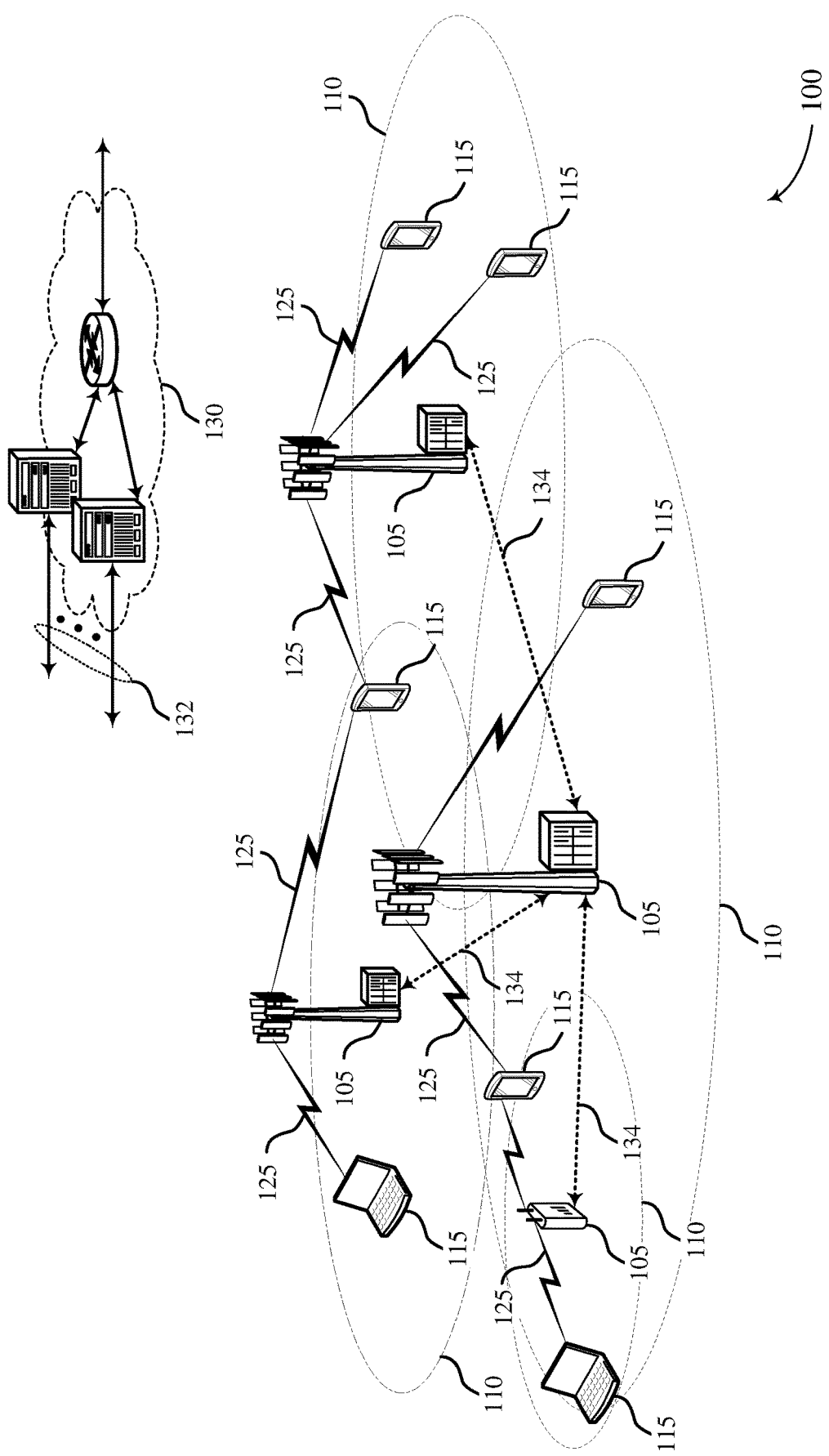
FIG. 1 illustrates an example of a system for wireless communication that supports robust acknowledgement retransmissions in accordance with aspects of the present disclosure.

FIG. 1 illustrates an example of a wireless communications system 100 that supports robust acknowledgement retransmissions in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols and in some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communication system 100 may implement various aspects described in more detail below to improve the robustness of acknowledgement retransmissions. In some examples, wireless communication system 100 enables TBs of data to be identified and associated with A/N retransmissions. In some examples, base station 105 may signal to UE 115 the TB of data to which an A/N retransmission request pertains. In other examples, when sending an A/N retransmission, UE 115 may signal to base station 105 the TB of data to which the A/N retransmission pertains.

Figure 2A:
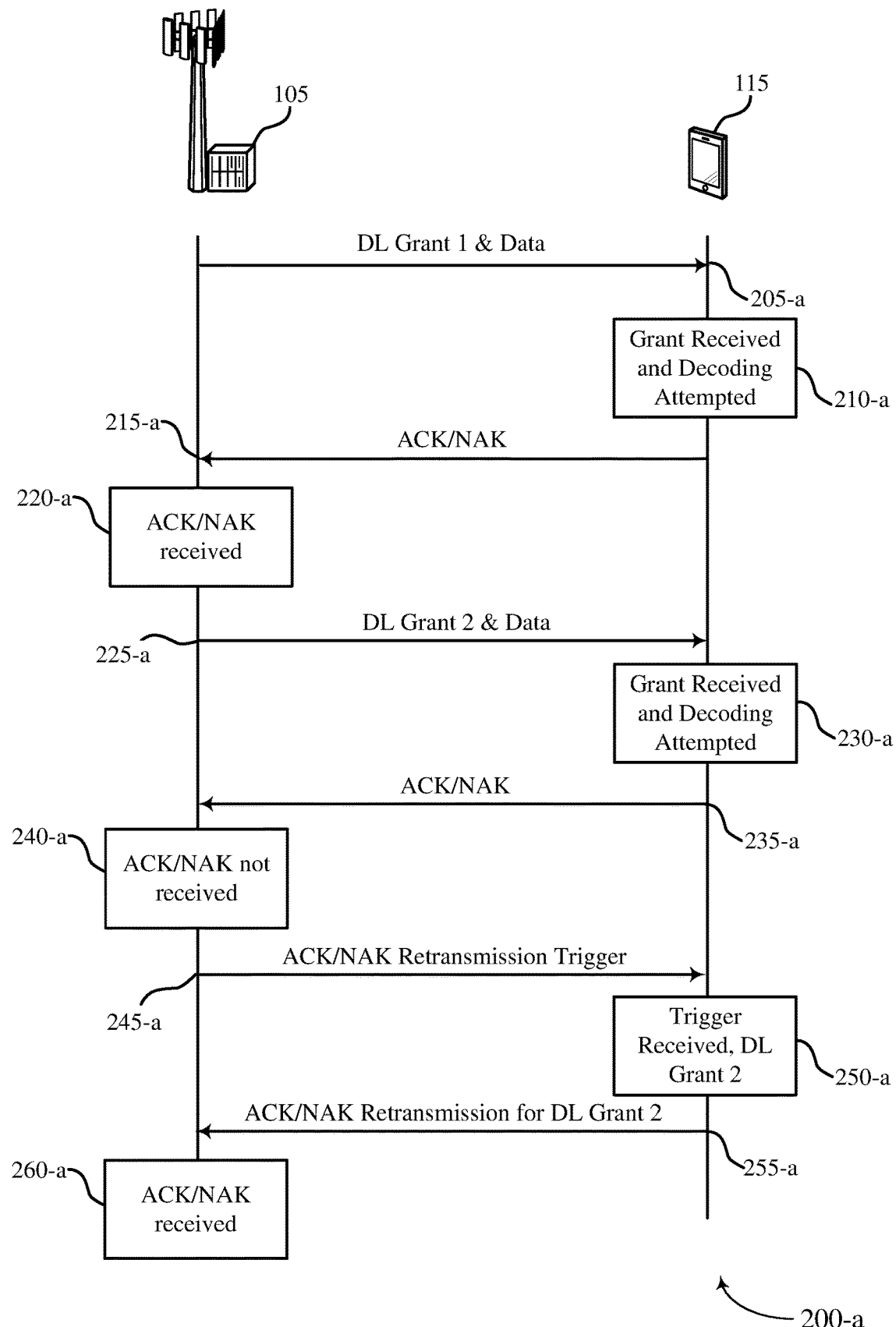
FIGS. 2A and 2B illustrate call flow diagrams showing communications related to acknowledgement transmissions scenarios.

FIG. 2A illustrates a call flow diagram 200-a between base station 105 and UE 115 according to one example scenario. At 205-a, base station 105 transmits a first downlink (DL) grant (DL grant 1) and an associated TB of data (e.g., a TB of data contained in a physical DL shared channel (PDSCH)) to UE 115. At 210-a, UE 115 receives DL grant 1 and attempts to decode the TB of data associated with DL grant 1. At 215-a, UE 115 transmits an A/N (e.g., ACK if the data was successfully decoded, NAK if the data was not successful decoded) to base station 105. At 220-a, base station 105 receives the A/N and determines whether the TB of data associated with DL grant 1 needs to be retransmitted.

At 225-a, base station 105 transmits a second DL grant (DL grant 2) and an associated TB of data (e.g., data different from the TB of data associated with DL grant 1) to UE 115. At 230-a, UE 115 receives DL grant 2 and attempts to decode the TB of data associated with DL grant 2. At 235-a, UE 115 transmits a second A/N to base station 105. Unlike the first A/N associated with DL grant 1, base station 105 does not receive the second A/N at 240-a. For example, the signal quality (e.g., signal-to-interference-plus-noise ratio (SINR)) may be such that base station 105 is unable to receive the second A/N. In response to not receiving the second A/N as expected, base station 105 sends an A/N retransmission request or trigger to UE 115 at 245-a. UE 115 receives the A/N retransmission trigger at 250-a and retransmits to base station 105 the A/N for the TB of data associated DL grant 2 at 255-a. At 260-a, base station 105 receives the retransmitted second A/N.

Figure 2B:
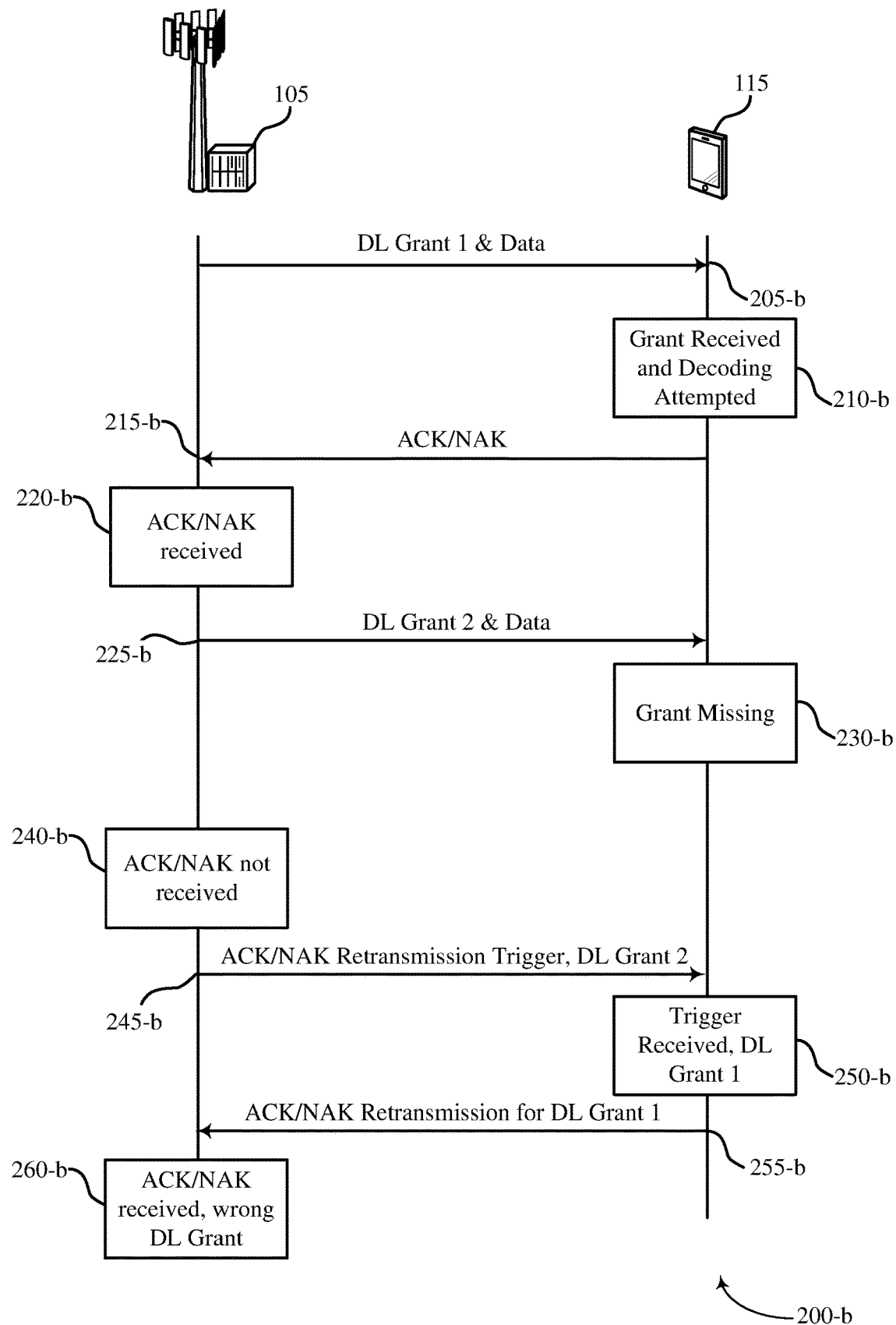

FIG. 2B illustrates a call flow diagram 200-b between base station 105 and UE 115 according to another example scenario in which UE 115 does not receive a DL grant transmitted by base station 105. At 205-b, base station 105 transmits a first DL grant (DL grant 1) and an associated TB of data to UE 115. At 210-b, UE 115 receives DL grant 1 and attempts to decode the TB of data associated with DL grant 1. At 215-b, UE 115 transmits an A/N (e.g., ACK if the data was successfully decoded, NAK if the data was not successful decoded) to base station 105. At 220-b, base station 105 receives the A/N and determines whether the TB of data associated with DL grant 1 needs to be retransmitted.

At 225-b, base station 105 transmits a second DL grant (DL grant 2) and an associated TB of data (e.g., data different from the TB of data associated with DL grant 1) to UE 115. At 230-b, however, UE 115 does not receive DL grant 2 and, therefore, UE 115 does not transmit a second A/N for the TB of data associated with the second DL grant. Base station 105 expects to receive a second A/N at a specified resource (e.g., time and frequency), but does not receive the second A/N at 240-b because UE 115 did not receive DL grant 2. However, base station 105 is unaware that UE 115 did not receive DL grant 2 and its associated TB of data and that this was the reason the second A/N is missing. Base station 105 sends an A/N retransmission request or trigger for DL grant 2 to UE 115 at 245-b. UE 115 receives the A/N retransmission trigger at 250-b but is unaware that the A/N retransmission trigger is for DL grant 2 and its associated TB of data. UE 115 interprets that the A/N retransmission trigger is for the last DL grant and associated TB of data it received (e.g., DL grant 1 and associated data) and retransmits to base station 105 the A/N for the TB of data associated DL grant 1 at 255-b. At 260-b, base station 105 receives the retransmitted A/N associated with DL grant 1 and interprets the retransmitted A/N as associated with DL grant 2, which is incorrect. To reduce or prevent errors in interpreting to which TB an A/N retransmission or A/N retransmission request is associated, message exchanges between base station 105 and UE 115 may be made more robust or enhanced as described in more detail below with reference to FIGS. 3-15.

Figure 3:
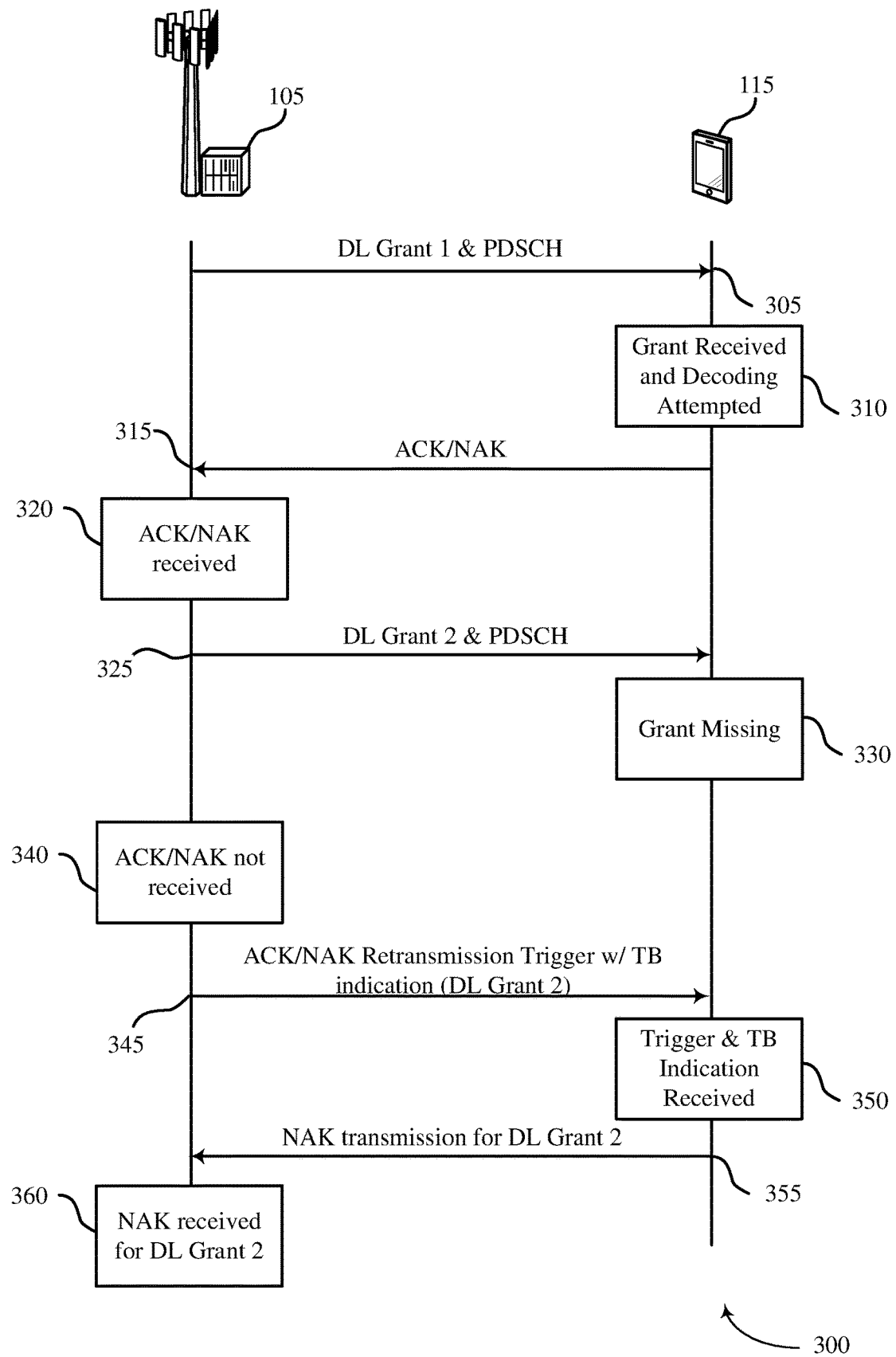
FIGS. 3 and 4 illustrate call flow diagrams showing communications that support robust acknowledgement retransmissions in accordance with aspects of the present disclosure.

FIG. 3 illustrates a call flow diagram 300 between base station 105 and UE 115 according to an example scenario in which an A/N retransmission request from base station 105 to UE 115 is enhanced or made more robust to reduce errors in mapping TBs to A/N retransmissions and/or retransmission requests. At 305, base station 105 transmits a first DL grant (DL grant 1) and an associated TB of data to UE 115. At 310, UE 115 receives DL grant 1 and attempts to decode the TB of data associated with DL grant 1. At 315, UE 115 transmits an A/N (e.g., ACK if the data was successfully decoded, NAK if the data was not successful decoded) to base station 105. At 320, base station 105 receives the A/N and determines whether the TB of data associated with DL grant 1 needs to be retransmitted.

At 325, base station 105 transmits a second DL grant (DL grant 2) and an associated TB of data (e.g., data different from the TB of data associated with DL grant 1) to UE 115. At 330, however, UE 115 does not receive DL grant 2 and, therefore, UE 115 does not transmit a second A/N for the TB of data associated with the second DL grant. Base station 105 expects to receive a second A/N at a specified resource (e.g., time and frequency), but does not receive the second A/N at 340 because UE 115 did not receive DL grant 2. However, base station 105 is unaware that UE 115 did not receive DL grant 2 and its associated TB of data and that this was the reason the second A/N is missing.

According to one aspect, base station 105 sends an A/N retransmission request or trigger for DL grant 2 to UE 115 at 345. Unlike the A/N retransmission request or trigger described with reference to FIG. 2, the A/N retransmission at 345 includes a TB indication that indicates that the A/N retransmission request relates to DL grant 2. The TB indication may include any information that enables UE 115 to identify the TB of data associated with the A/N retransmission request. In one example, the TB indication may include a slot number indication for the TB of data, which may allow UE 115 to identify the appropriate TB of data. The slot number indication may include an absolute slot number, a modulo absolute slot number (to reduce the size of the field of the TB indication), a relative slot number from a current slot, or the like. In another example, the TB indication may include a new data indicator (NDI) that switches values for each new TB of data. The NDI may correspond to a single bit of information (which may provide for a relatively small payload) or multiple bits (e.g., in situations where there are multiple code words for each HARQ process). The NDI may be useful in deployments in which the A/N retransmission trigger is for a single TB of data as opposed to one TB of data in a particular retransmission with multiple TBs of data. The A/N retransmission request transmitted to UE 115 may be one of multiple A/N retransmission requests associated with multiple HARQ processes transmitted in a signal to UE 115, and each A/N retransmission request may include an associated TB indication.

UE 115 receives the A/N retransmission trigger, including the TB indication, at 350. Because the A/N retransmission trigger includes the TB indication, UE 115 is able to identify that the A/N retransmission trigger is for DL grant 2 and its associated TB of data. For example, when an NDI is used, UE 115 may compare the NDI of the TB indication with the NDI of the latest TB of data it received (e.g., the TB of data associated with DL grant 1). If the NDIs are the same, UE 115 may identify that the A/N retransmission trigger corresponds to the last TB of data it received and may retransmit the A/N for that TB of data. If the NDIs are not the same, as would be the case depicted in FIG. 3, UE 115 may identify that it missed DL grant 2 and its associated TB of data. Accordingly, at 355, UE 115 may transmit a NAK to base station 105 in response to receiving and processing the A/N retransmission trigger and TB indication. In an alternative example, UE 115 and base station 105 may be configured to transmit, receive, and process tri-state A/N in which the third A/N state may provide an explicit indication that a DL grant was missed. At 360, base station 105 receives the NAK (or tri-state A/N) for DL grant 2 and may then retransmit DL grant 2 and its TB of data in accordance with HARQ techniques. The technique depicted in FIG. 3 may result in a larger downlink control information (DCI) payload given that the TB indication is included with the A/N retransmission trigger and an A/N retransmission that has little, to no, change in its payload compared to conventional techniques. In some situations, the larger DCI payload resulting from including the TB indication may enable less blind decoding for UE 115, which may conventionally be enabled by zero padding the DCI.

Figure 4:
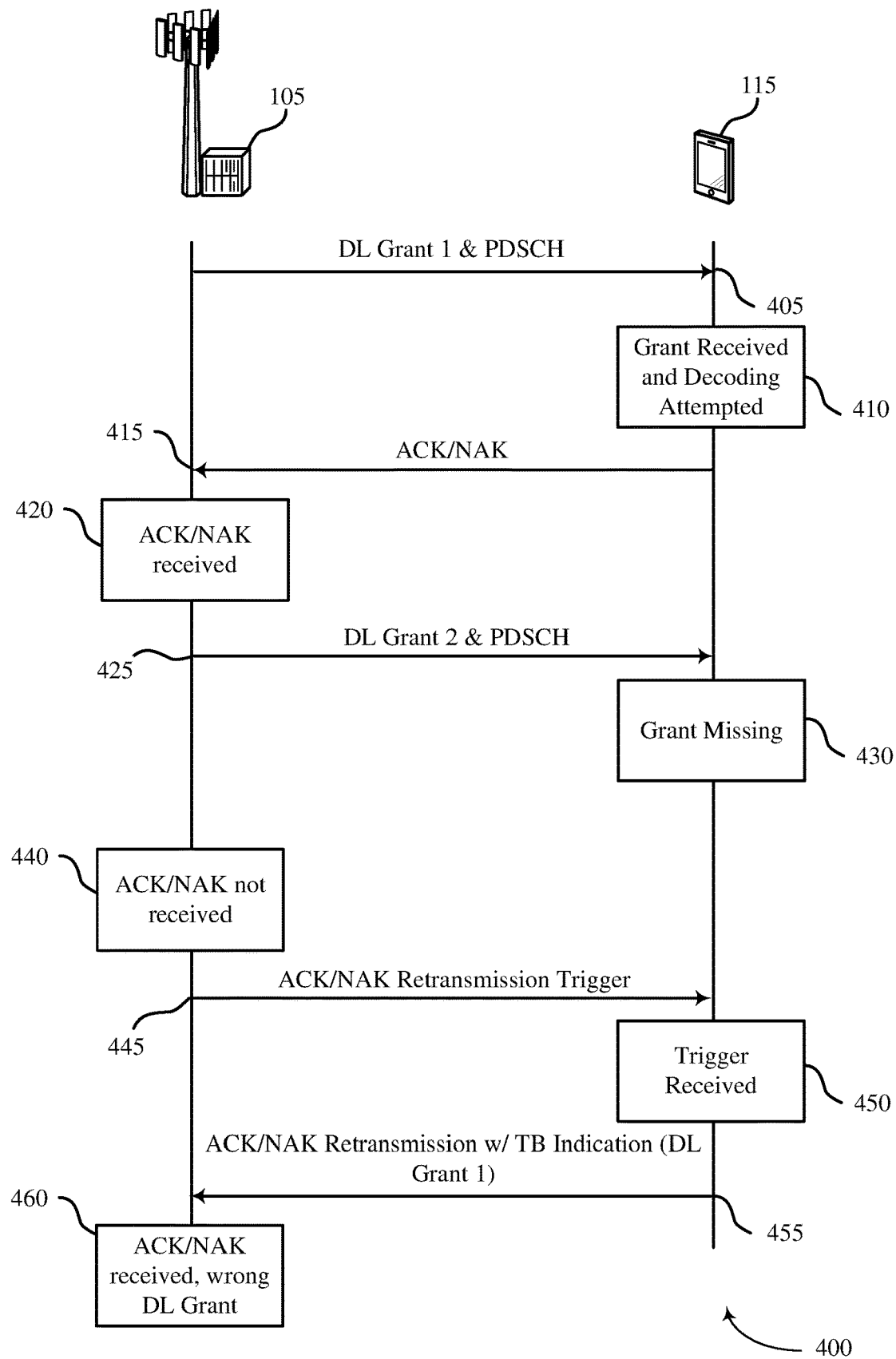

FIG. 4 illustrates a call flow diagram 400 between base station 105 and UE 115 according to an example scenario in which an A/N retransmission from UE 115 to base station 105 is enhanced or made more robust to reduce errors in mapping TBs to A/N retransmissions and/or retransmission requests. At 405, base station 105 transmits a first DL grant (DL grant 1) and an associated TB of data to UE 115. At 410, UE 115 receives DL grant 1 and attempts to decode the TB of data associated with DL grant 1. At 415, UE 115 transmits an A/N (e.g., ACK if the data was successfully decoded, NAK if the data was not successful decoded) to base station 105. At 420, base station 105 receives the A/N and determines whether the TB of data associated with DL grant 1 needs to be retransmitted.

At 425, base station 105 transmits a second DL grant (DL grant 2) and an associated TB of data (e.g., data different from the TB of data associated with DL grant 1) to UE 115. At 430, however, UE 115 does not receive DL grant 2 and, therefore, UE 115 does not transmit a second A/N for the TB of data associated with the second DL grant. Base station 105 expects to receive a second A/N at a specified resource (e.g., time and frequency), but does not receive the second A/N at 440 because UE 115 did not receive DL grant 2. However, base station 105 is unaware that UE 115 did not receive DL grant 2 and its associated TB of data and that this was the reason the second A/N is missing.

Base station 105 sends an A/N retransmission request or trigger for DL grant 2 to UE 115 at 445. UE 115 receives the A/N retransmission trigger at 450. At 455, UE 115 transmits an A/N retransmission to base station 105. In this example, the A/N retransmission includes a TB indication. As described above with reference to FIG. 3, the TB indication may include any information that enables base station 105 to identify the TB of data associated with the A/N retransmission. For example, this information may include a slot number and/or an NDI.

At 460, base station 105 receives the A/N retransmission including the TB indication, which, in this case, indicates the TB associated with DL grant 1. Because the A/N retransmission includes the TB indication, base station 105 is able to identify that the A/N retransmission is for DL grant 1 and its associated TB of data. Base station 105 may compare the TB indication with TB information of the TB corresponding to the A/N retransmission trigger (e.g., TB associated with DL grant 2). The comparison by base station 105 may be similar to the comparison by UE 115 described with reference to FIG. 3 (e.g., comparison of NDIs and/or slot numbers). Based on this comparison, base station 105 may identify that UE 115 did not receive DL grant 2 and its associated TB of data and may retransmit DL grant 2 and its TB of data to UE 115. The technique depicted in FIG. 4 may result an A/N retransmission with a larger payload, given that the TB indication is included with the A/N retransmission, and a DCI payload that has little, to no change, in its payload compared to conventional techniques.

Figure 5:
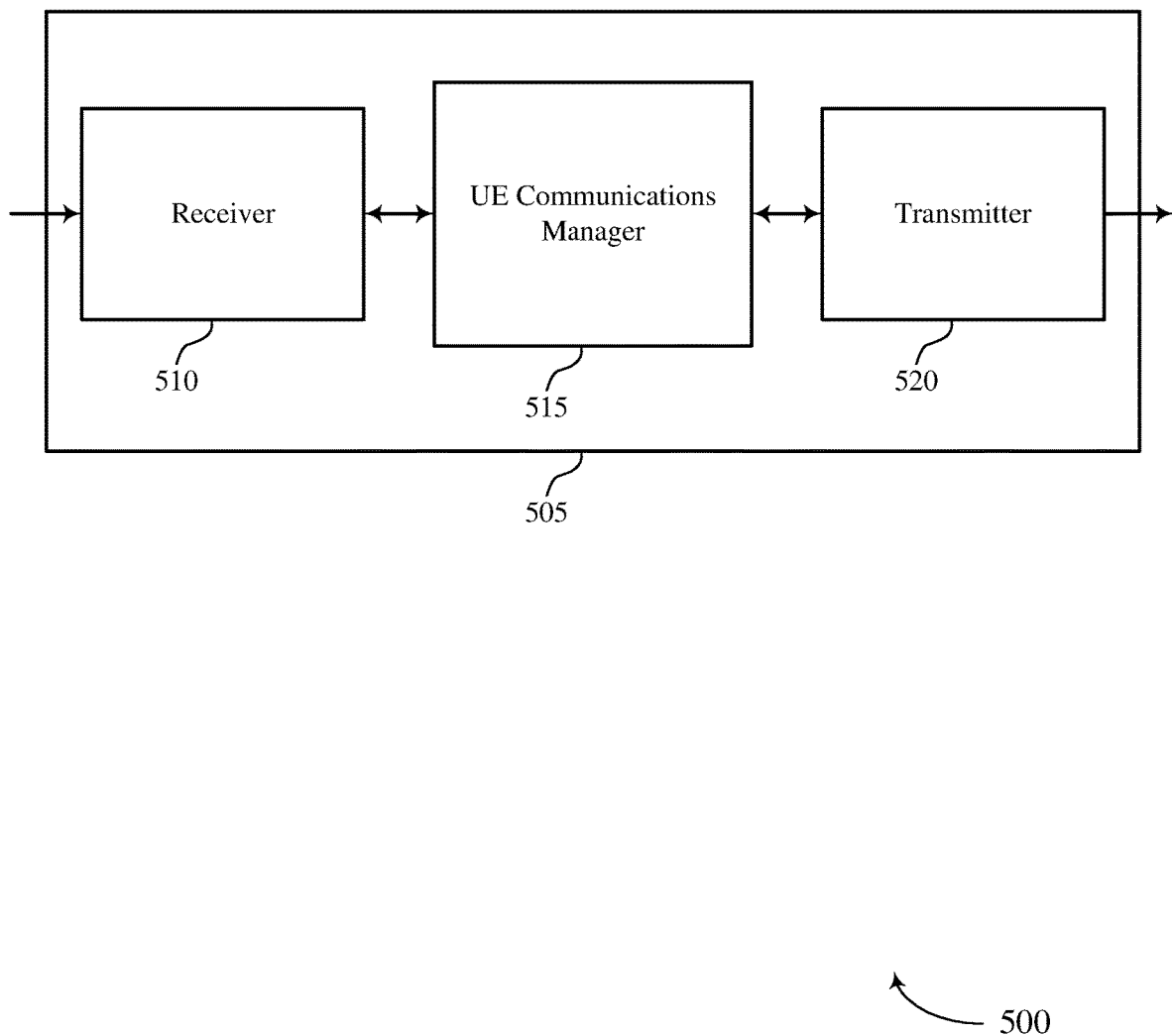
FIGS. 5 and 6 show block diagrams of a device that supports robust acknowledgement retransmissions in accordance with aspects of the present disclosure.

The techniques described with reference to FIGS. 3 and 4 may be utilized for a single HARQ process, a set of HARQ processes, or all HARQ processes. When the techniques are used for one HARQ process, base station 105 and/or UE 115 may be enabled to signal a HARQ process identification (ID) in an A/N retransmission trigger. When the techniques are used for a set of HARQ processes, base station 105 and/or UE 115 may be enabled to signal which HARQ processes are subject to an A/N retransmission trigger (e.g., via a list of triggered HARQ processes or a bitmap indicating the list). When the techniques are used for all HARQ processes, base station 105 and/or UE 115 may refrain from indicating which HARQ process are involved with an A/N retransmission trigger FIG. 5 shows a block diagram 500 of a wireless device 505 that supports robust acknowledgement retransmissions in accordance with aspects of the present disclosure. Wireless device 505 may be an example of aspects of a user equipment (UE) 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to robust acknowledgement retransmissions (e.g., TB indications), etc.). Information may be passed on to other components of the device. The receiver 510 may utilize a single antenna or a set of antennas. The receiver 510 may be an example of aspects of the transceiver 735 described with reference to FIG. 7.

Receiver 510 may receive DL grants and associated TB s of data, A/N retransmission requests, and TB indications as described with reference to FIGS. 1-4. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE communications manager 515 may be an example of aspects of the UE communications manager 715 described with reference to FIG. 7.

UE communications manager 515 may attempt to decode TB s of data, process A/N retransmission requests and TB indications, may compare TB indications with other information to identify an appropriate A/N retransmission response, and may generate TB indications, as described with reference to FIGS. 1-4.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Transmitter 520 may transmit information such as packets, user data, or control information associated with various information channels (e.g., control channels, data channels, and information related to robust acknowledgement retransmissions (e.g., TB indications), etc.). In some examples, transmitter 520 may transmit A/Ns, A/N retransmissions, and TB indications, as described with reference to FIGS. 1-4.

Figure 6:
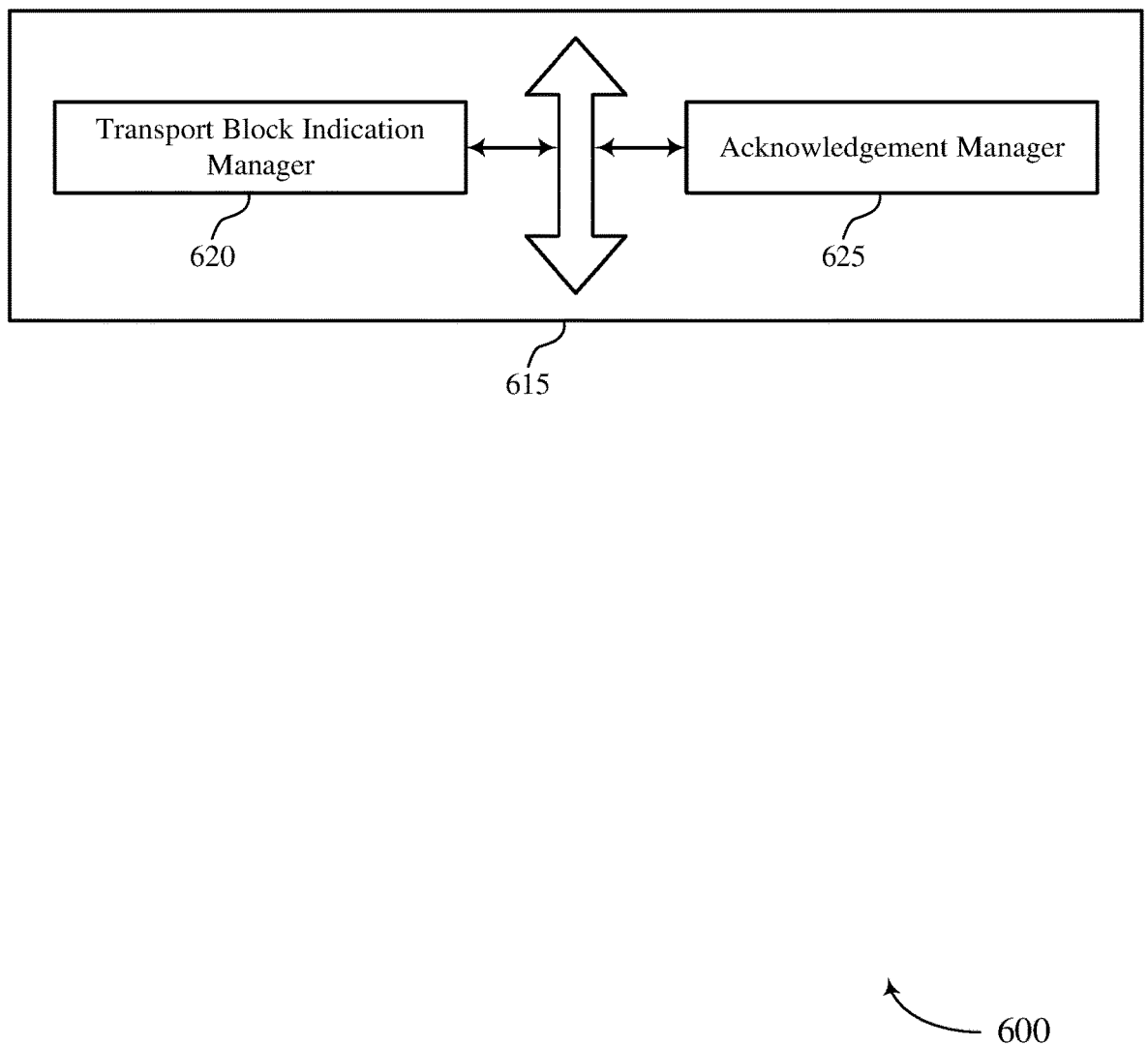

FIG. 6 shows a block diagram 600 of a UE communications manager 615 that supports robust acknowledgement retransmissions in accordance with aspects of the present disclosure. The UE communications manager 615 may be an example of aspects of a UE communications manager 515, or a UE communications manager 715 described with reference to FIGS. 5 and 7. The UE communications manager 615 may include a TB indication manager 620 and an A/N manager 625. Each of these modules may communicate, directly or indirectly, with one another (e.g., via one or more buses).

TB indication manager 620 may process TB indications received with A/N retransmission requests from base station 105 and compare the TB indications to TB information of TB s that the UE has received to determine whether wireless device 505 has missed a DL grant and associated data transmitted from base station 105, as described above with reference to FIG. 3. TB indication manager 620 may also generate TB indications that are to be transmitted to base station 105, together with A/N retransmissions, to inform base station 105 as to the TB of data the A/N retransmission pertains, as described above with reference to FIG. 4.

A/N manager 625 may manage the generation of A/N messages to be transmitted to base station 105 in response to receiving DL grants and processing associated TBs of data, as described with reference to FIGS. 1-5. A/N manager 625 may also manage the generation of A/N retransmission messages in response to receiving A/N retransmission requests, as described with reference to FIGS. 1-5.

Figure 7:
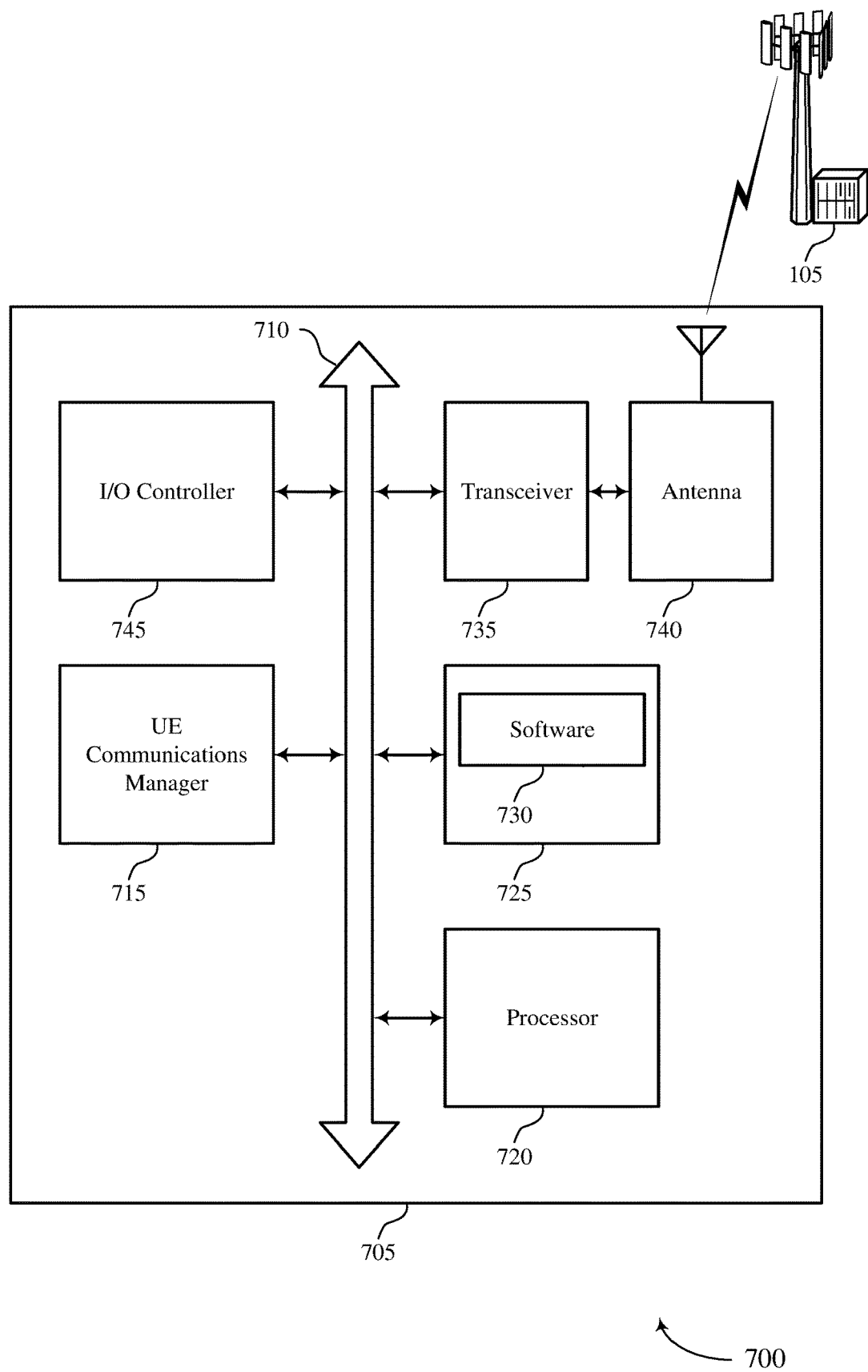
FIG. 7 illustrates a block diagram of a system including a UE that supports robust acknowledgement retransmissions in accordance with aspects of the present disclosure.

FIG. 7 shows a diagram of a system 700 including a device 705 that supports robust acknowledgement retransmissions in accordance with aspects of the present disclosure. Device 705 may be an example of or include the components of wireless device 705, or a UE 115 as described above, e.g., with reference to FIGS. 1 through 6. Device 705 may include components for bi-directional voice and data communications including components for transmitting and receiving communications, including UE communications manager 715, processor 720, memory 725, software 730, transceiver 735, antenna 740, and I/O controller 745. These components may be coupled to each other (e.g., in electronic communication) via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting robust acknowledgement retransmissions).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support robust acknowledgement retransmissions. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets from signals received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
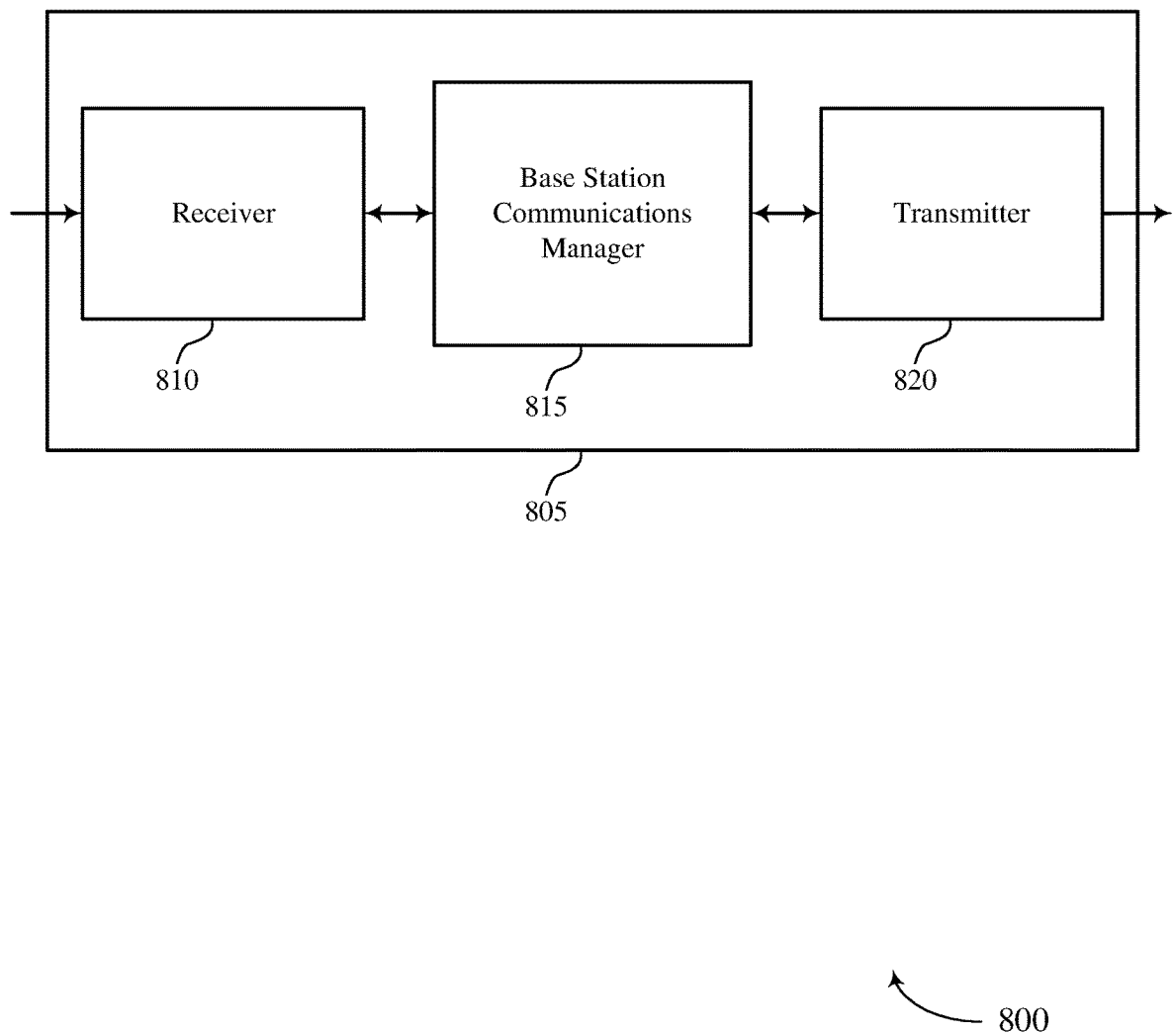
FIGS. 8 and 9 show block diagrams of a device that supports robust acknowledgement retransmissions in accordance with aspects of the present disclosure.

FIG. 8 shows a block diagram 600 of a wireless device 805 that supports robust acknowledgement retransmissions in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to robust acknowledgement retransmissions (e.g., A/N messages and retransmissions, TB indications), etc.). Information may be passed on to other components of the device. The receiver 810 may utilize a single antenna or a set of antennas. The receiver 810 may be an example of aspects of the transceiver 1035 described with reference to FIG. 10.

In one example, receiver 810 may receive A/N transmissions, A/N retransmissions and TB indications, as described with reference to FIGS. 1 through 7. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station communications manager 815 may be an example of aspects of the base station communications manager 1015 described with reference to FIG. 10.

Base station communications manager 815 may process data received from UE 115 (or device 505), process A/N transmissions, A/N retransmissions, and TB indications, may compare TB indications with other information to identify whether an A/N retransmission corresponds to a correct TB of to which an A/N retransmission request was directed, and may generate TB indications, as described with reference to FIGS. 1-7.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Transmitter 820 may transmit different types of information such as packets, user data, or control information associated with various information channels (e.g., control channels, data channels, and information related to robust acknowledgement retransmissions (e.g., A/N retransmission requests, TB indications), etc.). Information may be passed on to other components of the device. The transmitted 820 may utilize a single antenna or a set of antennas.

Figure 9:
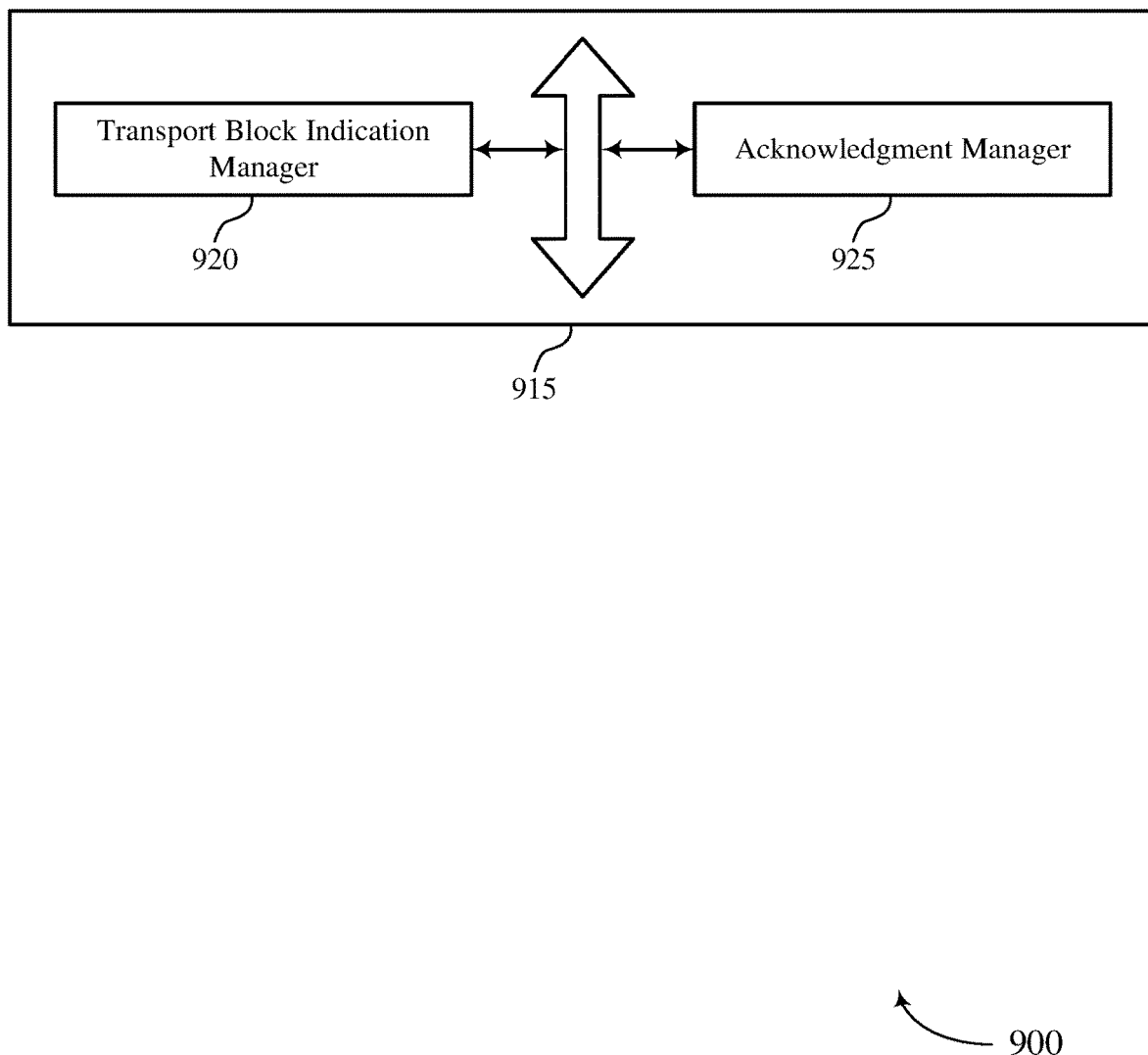

FIG. 9 shows a block diagram 900 of a base station communications manager 915 that supports robust acknowledgement retransmissions in accordance with aspects of the present disclosure. The base station communications manager 915 may be an example of aspects of base station communications manager 815 described with reference to FIG. 8 and/or a base station communications manager 1015 described with reference to FIG. 10. The base station communications manager 915 may include TB indication manager 920 and A/N manager 925. Each of these modules may communicate, directly or indirectly, with one another (e.g., via one or more buses).

TB indication manager 920 may generate TB indications that are to be transmitted with A/N retransmission requests to UE 115 (or wireless device 505) to inform UE 115 as to the TB of data the A/N retransmission request pertains, as described above with reference to FIG. 3. TB indication manager 920 may also process TB indications received with A/N retransmission from UE 115 (or wireless device 505) and compare the TB indications to TB information of a TB of data that corresponds to an A/N retransmission request to determine whether that UE 115 has missed a DL grant and associated data transmitted to UE 115, as described above with reference to FIG. 4.

A/N manager 925 may process A/N messages received from UEs 115 (or wireless devices 505) and may generate A/N retransmission requests based on received A/N messages, as described with reference to FIGS. 1-8.

Figure 10:
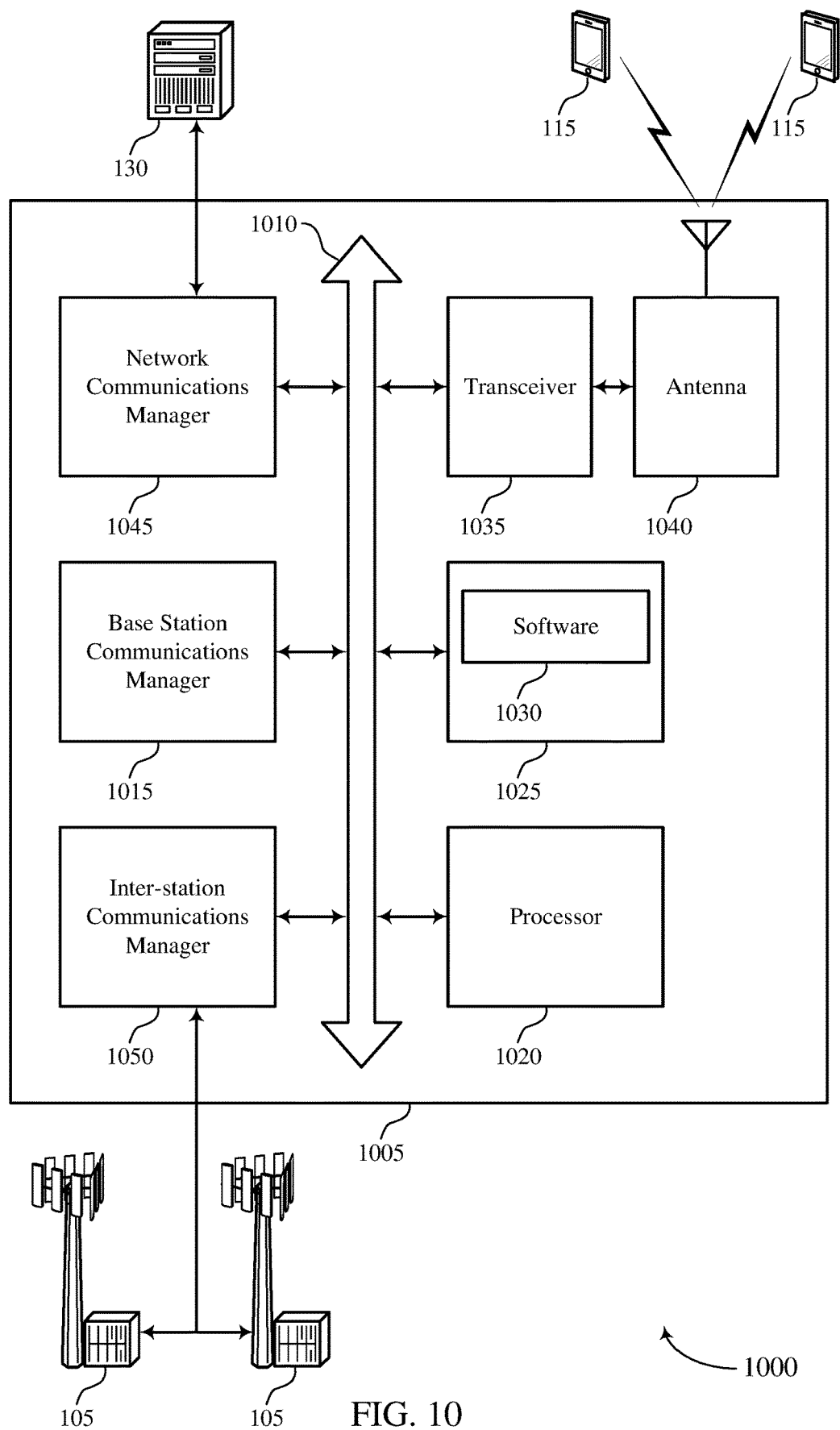
FIG. 10 illustrates a block diagram of a system including a base station that supports robust acknowledgement retransmissions in accordance with aspects of the present disclosure.

FIG. 10 shows a diagram of a system 1000 including a device 1005 that supports robust acknowledgement retransmissions in accordance with aspects of the present disclosure. Device 1005 may be an example of or include the components of base station 105 as described above, e.g., with reference to FIGS. 1-4. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting robust acknowledgement retransmissions).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support robust acknowledgement retransmissions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets from signals received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station(s) 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
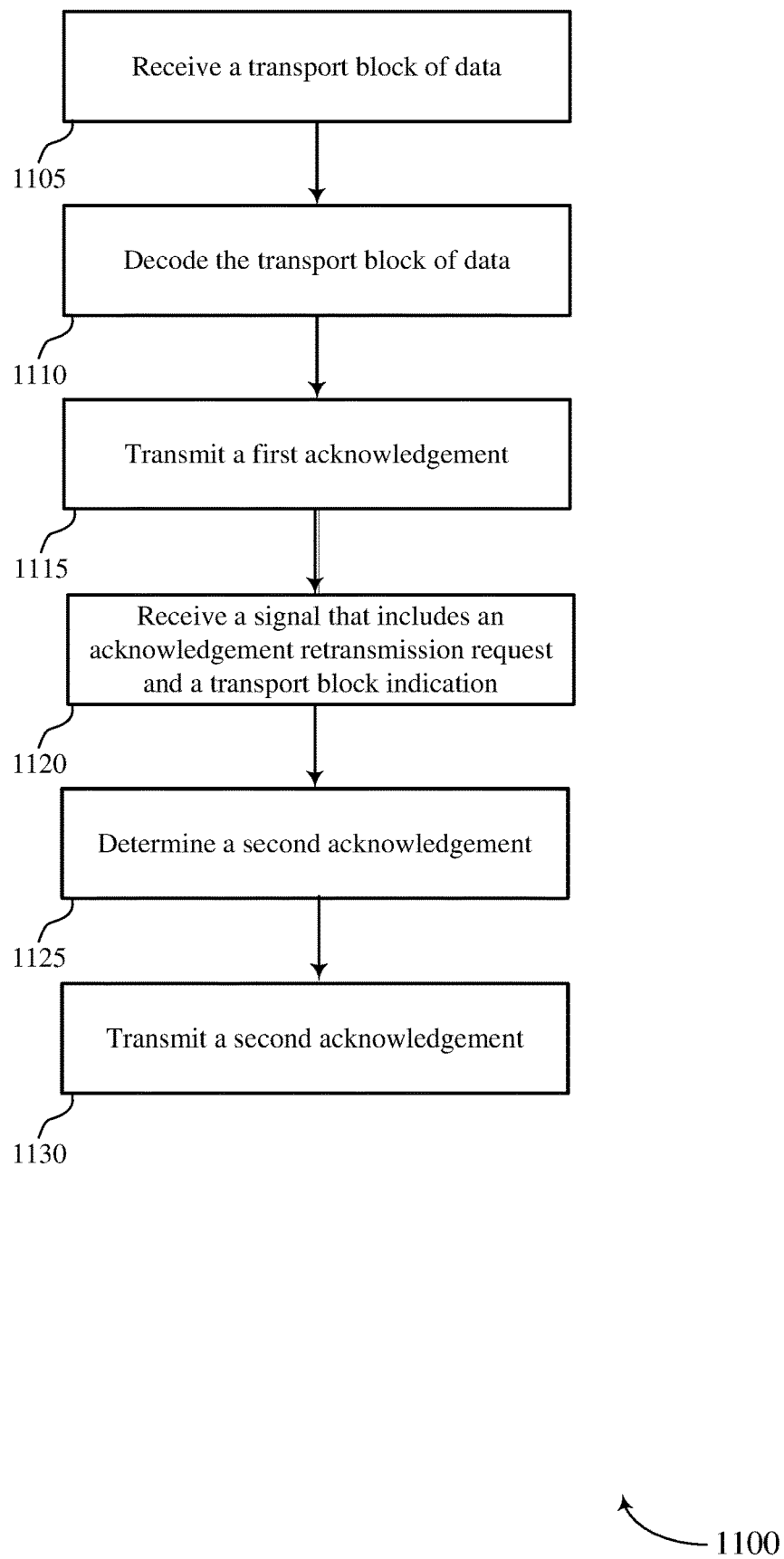
FIGS. 11-16 illustrate methods for robust acknowledgement retransmissions in accordance with aspects of the present disclosure.

FIG. 11 shows a flowchart illustrating a method 1100 for robust acknowledgement retransmissions in accordance with aspects of the present disclosure. The operations of method 1100 may be implemented by a UE 115 or its components as described herein. For example, one or more of the operations of method 1100 may be performed by a UE communications manager as described with reference to FIGS. 5-7. In some examples, UE 115 may execute a set of codes to control the functional elements of the device to perform the functions described below. Additionally or alternatively, UE 115 may perform aspects of the functions described below using special-purpose hardware.

At block 1105, UE 115 may receive a TB of data from a network (e.g., from base station 105). The operations of block 1105 may be performed according to the methods described herein. In certain examples, aspects of the operations of block 1105 may be performed by a receiver as described with reference to FIGS. 5-7.

At block 1110, UE 115 may decode the TB of data. The operations of block 1110 may be performed according to the methods described herein. In certain examples, aspects of the operations of block 1110 may be performed by a UE communications manager and/or a processor as described with reference to FIGS. 5-7.

At block 1115, UE 115 may transmit to the network a first A/N based on the results of the decoding. The operations of block 1115 may be performed according to the methods described herein. In certain examples, aspects of the operations of block 1115 may be performed by a transmitter as described with reference to FIGS. 5-7.

At block 1120, UE 115 may receive a signal from the network that includes an A/N retransmission request and a TB indication that indicates a TB of data to which the A/N retransmission request relates. The operations of block 1120 may be performed according to the methods described herein. In certain examples, aspects of the operations of block 1120 may be performed by a receiver as described with reference to FIGS. 5-7.

At block 1125, UE 115 may determine a second A/N based on the A/N retransmission request and the TB indication. The operations of block 1125 may be performed according to the methods described herein. In certain examples, aspects of the operations of block 1125 may be performed by UE communications manager, including a TB indication manager and/or an A/N manager, as described with reference to FIGS. 5-7. Example operations that may be performed at block 1125 are also further described below with reference to FIG. 12.

At block 1130 UE 115 may transmit the second A/N to the network. The operations of block 1130 may be performed according to the methods described herein. In certain examples, aspects of the operations of block 1130 may be performed by a transmitter as described with reference to FIGS. 5-7.

Figure 12:
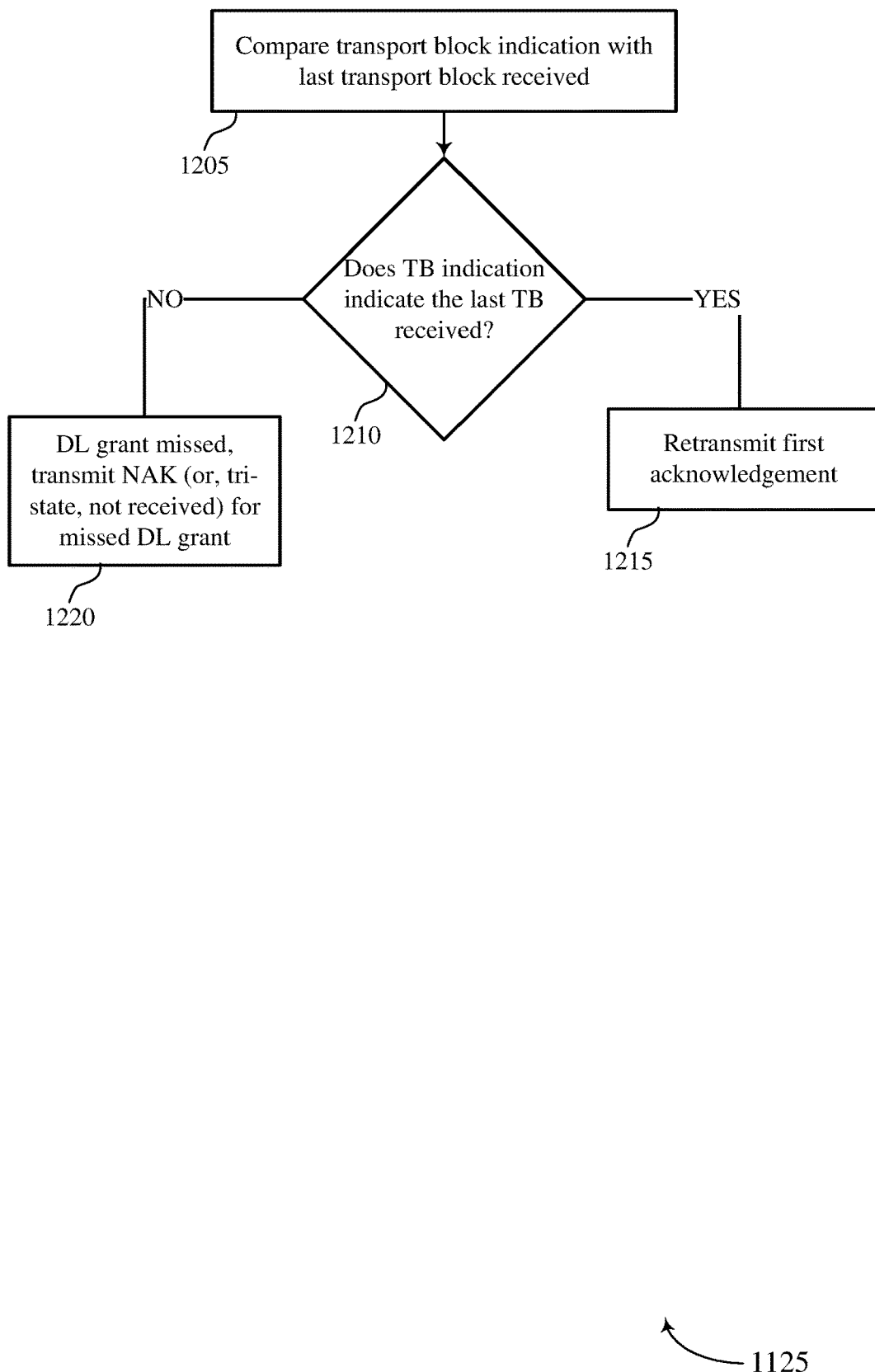

FIG. 12 shows a flowchart illustrating example details of steps that may be performed in connection with block 1125 of FIG. 11. At block 1205, UE 115 may compare the transport block indication with the last transport block that UE 115 received. Examples of types of TB indications (e.g., NDIs, slot numbers) are further described above with reference to FIG. 3. At block 1210, the UE 115 determines whether the TB indication received from base station 105 indicates (corresponds to) the last TB received by UE 115 based on the comparison at block 1205. If the TB indication corresponds to the last TB received (i.e., a "YES" decision), UE 115 retransmits the first acknowledgement as the second acknowledgement at block 1215. If, however, the TB indication does not correspond to the last TB received (e.g., UE 115 missed a DL grant), UE 115 transmits a NAK (or a tri-state A/N signal explicitly indicating that a DL grant was missed) to base station 105 at block 1220.

Figure 13:
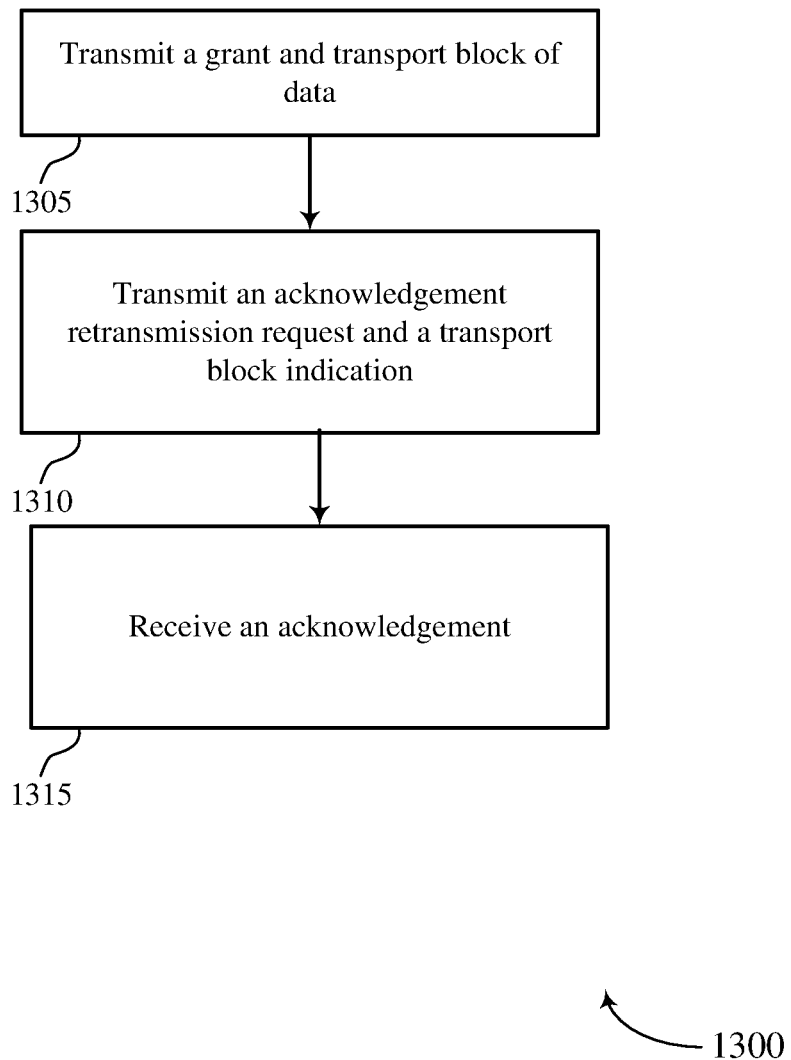

FIG. 13 shows a flowchart illustrating a method 1300 for robust acknowledgement retransmissions in accordance with aspects of the present disclosure. The operations of method 1300 may be implemented by a base station 105 or its components as described herein. For example, the operations of method 1300 may be performed by a base station communications manager as described with reference to FIGS. 8-10. In some examples, a base station 105 may execute a set of codes to control the functional elements of the device to perform the functions described below. Additionally or alternatively, the base station 105 may perform aspects of the functions described below using special-purpose hardware.

At block 1305, base station 105 may transmit a DL grant and TB of data associated with the DL grant to UE 115. The operations of block 1305 may be performed according to the methods described herein. In certain examples, aspects of the operations of block 1305 may be performed by a transmitter as described with reference to FIGS. 8-10.

At block 1310, base station 105 may transmit a signal to UE 115 that includes an acknowledgement retransmission request and a TB indication related to the acknowledgement retransmission request. The TB indication may identify the TB of data transmitted to UE 115. Base station 105 may transmit the signal in response to not receiving an A/N message from UE 115 at an expected resource. The operations of block 1310 may be performed according to the methods described herein. In certain examples, aspects of the operations of block 1310 may be performed by a transmitter and/or a base station communications manager as described with reference to FIGS. 8-10.

At block 1315, base station 105 receives an A/N from UE 115 for the TB of data. The operations of block 1315 may be performed according to the methods described herein. In certain examples, aspects of the operations of block 1315 may be performed by a receiver as described with reference to FIGS. 8-10.

Figure 14:
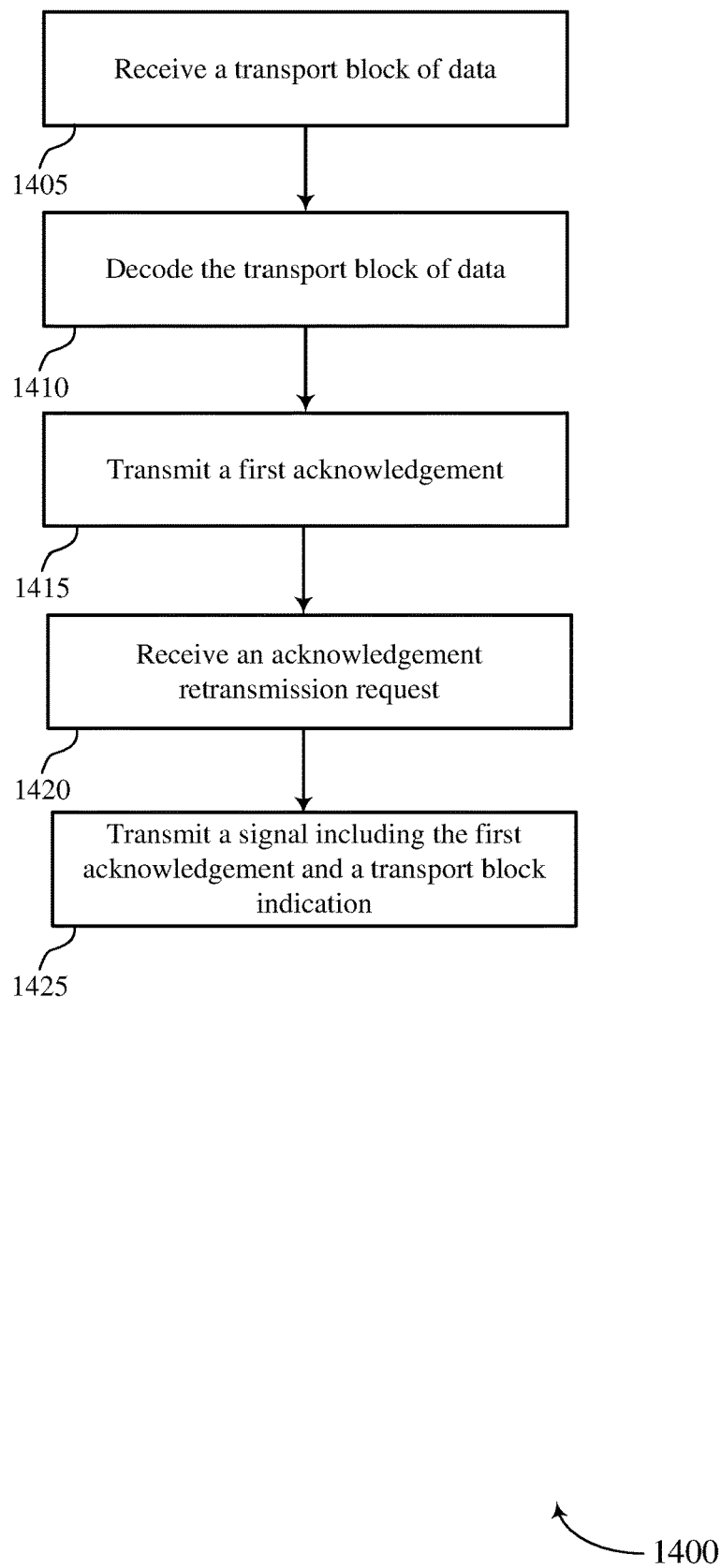

FIG. 14 shows a flowchart illustrating a method 1400 for robust acknowledgement retransmissions in accordance with aspects of the present disclosure. The operations of method 1400 may be implemented by a UE 115 or its components as described herein. For example, one or more of the operations of method 1400 may be performed by a UE communications manager as described with reference to FIGS. 5-7. In some examples, UE 115 may execute a set of codes to control the functional elements of the device to perform the functions described below. Additionally or alternatively, UE 115 may perform aspects of the functions described below using special-purpose hardware.

At block 1405, UE 115 may receive a TB of data from a network (e.g., from base station 105). The operations of block 1405 may be performed according to the methods described herein. In certain examples, aspects of the operations of block 1405 may be performed by a receiver as described with reference to FIGS. 5-7.

At block 1410, UE 115 may decode the TB of data. The operations of block 1410 may be performed according to the methods described herein. In certain examples, aspects of the operations of block 1410 may be performed by a UE communications manager as described with reference to FIGS. 5-7.

At block 1415, UE 115 may transmit to the network a first A/N based on the results of the decoding. The operations of block 1415 may be performed according to the methods described herein. In certain examples, aspects of the operations of block 1415 may be performed by a transmitter as described with reference to FIGS. 5-7.

At block 1420, UE 115 may receive a signal from the network that includes an A/N retransmission request. The operations of block 1420 may be performed according to the methods described herein. In certain examples, aspects of the operations of block 1420 may be performed by a receiver as described with reference to FIGS. 5-7.

At block 1425, UE 115 may transmit to base station 105 a signal including the first A/N and a TB indication that indicates that the first A/N is associated with the TB of data that UE 115 received at block 1405. The operations of block 1425 may be performed according to the methods described herein. In certain examples, aspects of the operations of block 1425 may be performed by UE communications manager, including a TB indication manager and/or an A/N manager, as described with reference to FIGS. 5-7.

Figure 15:
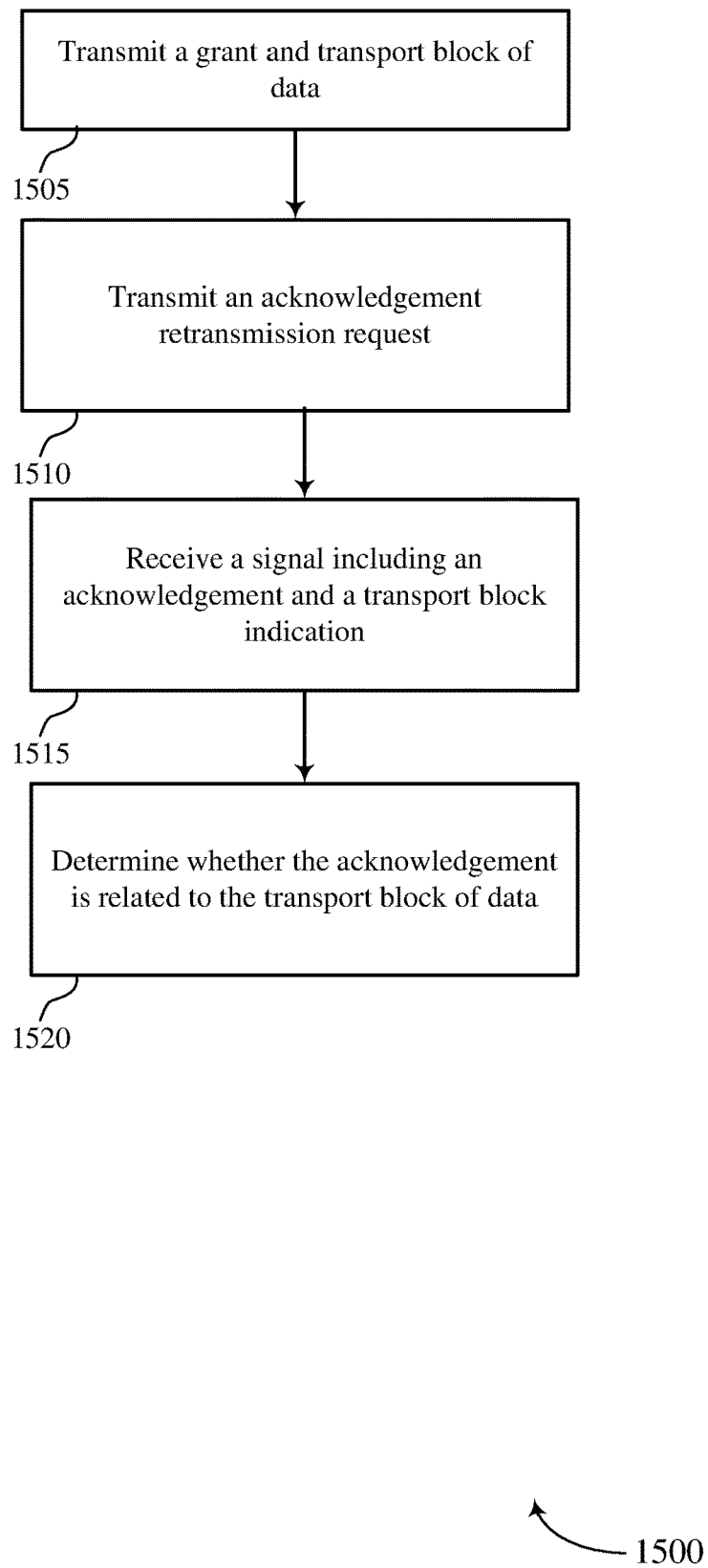

FIG. 15 shows a flowchart illustrating a method 1500 for robust acknowledgement retransmissions in accordance with aspects of the present disclosure. The operations of method 1500 may be implemented by a base station 105 or its components as described herein. For example, the operations of method 1500 may be performed by a base station communications manager as described with reference to FIGS. 8-10. In some examples, a base station 105 may execute a set of codes to control the functional elements of the device to perform the functions described below. Additionally or alternatively, the base station 105 may perform aspects of the functions described below using special-purpose hardware.

At block 1505, base station 105 may transmit a DL grant and TB of data associated with the DL grant to UE 115. The operations of block 1505 may be performed according to the methods described herein. In certain examples, aspects of the operations of block 1505 may be performed by a transmitter as described with reference to FIGS. 8-10.

At block 1510, base station 105 may transmit to UE 115 a signal that includes an acknowledgement retransmission request. In this example, the signal does not include a TB indication. The operations of block 1510 may be performed according to the methods described herein. In certain examples, aspects of the operations of block 1510 may be performed by a transmitter and/or a base station communications manager as described with reference to FIGS. 8-10.

At block 1515, base station 105 receives from UE 115 a signal that includes an A/N and a TB indication. The TB indication may identify the TB of data to which the A/N of the signal relates. The operations of block 1515 may be performed according to the methods described herein. In certain examples, aspects of the operations of block 1515 may be performed by a receiver as described with reference to FIGS. 8-10.

At block 1520, base station 105 may determine whether the A/N is related to the TB of data sent at block 1505 based on the TB indication received at block 1515. The operations of block 1520 may be performed according to the methods described herein. In certain examples, aspects of the operations of block 1520 may be performed by base station communications manager, including a TB indication manager and/or an A/N manager, as described with reference to FIGS. 8-10. Example operations that may be performed at block 1520 are also further described below with reference to FIG. 16.

Figure 16:
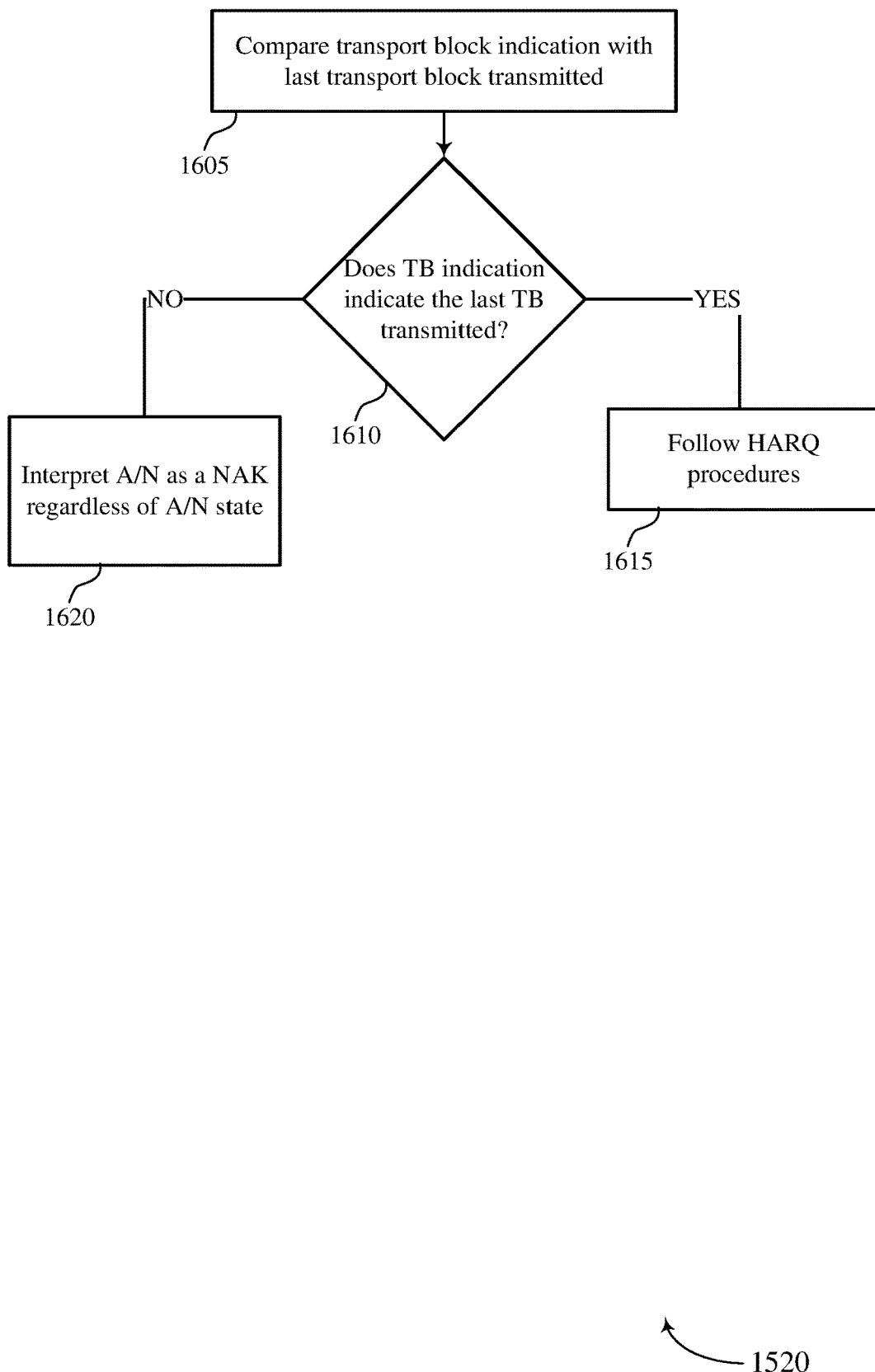

FIG. 16 shows a flowchart illustrating example details of steps that may be performed in connection with block 1520 of FIG. 15. At block 1605, base station 105 may compare the transport block indication received from UE 115 with transport block information associated with TB sent at block 1505. Examples of types of TB indications (e.g., NDIs, slot numbers) are further described above with reference to FIG. 3. At block 1610, base station 105 determines whether the TB indication received from UE 115 indicates (corresponds to) the last TB transmitted by base station 105 based on the comparison at block 1605. If the TB indication corresponds to the last TB transmitted (i.e., a "YES" decision), base station 105 follows a normal HARQ procedure and responds appropriately to the ACK or NAK received at block 1615. If, however, the TB indication does not correspond to the last TB transmitted (e.g., UE 115 missed a DL grant), at block 1620 base station 105 interprets the A/N received from UE 115 as a NAK regardless of the true state of the A/N. For example, in response to block 1620, base station 105 may retransmit the DL grant and TB of data to UE 115.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    receiving a transport block (TB) of data from a network;
    decoding the TB of data, wherein the TB of data has a corresponding new data indicator having a first value;
    transmitting to the network a first acknowledgement based on a result of the decoding;
    receiving a signal from the network that includes an acknowledgement retransmission request and a TB indication that indicates a TB of data to which the acknowledgement retransmission request relates, wherein the TB indication corresponds to a new data indicator having a second value;
    determining a second acknowledgement based on the acknowledgement retransmission request and the TB indication, wherein the determining comprises:
        comparing the first value and the second value,
        repeating the first acknowledgement as the second acknowledgement in response to the first value and the second value being the same, and
        setting the second acknowledgement to a negative acknowledgement in response to the first value and the second value being different; and
    transmitting the second acknowledgement to the network.

2. A method for wireless communication by a user equipment (UE), comprising:
    receiving a transport block (TB) of data from a network;
    decoding the TB of data, wherein the TB of data has a corresponding new data indicator having a first value;
    transmitting to the network a first acknowledgement based on a result of the decoding;
    receiving a signal from the network that includes an acknowledgement retransmission request and a TB indication that indicates a TB of data to which the acknowledgement retransmission request relates, wherein the TB indication corresponds to a new data indicator having a second value;
    determining a second acknowledgement based on the acknowledgement retransmission request and the TB indication, the determining further comprising:
        comparing the first value and the second value; and
        setting the second acknowledgement to an indication that a grant of data corresponding to the TB indication was not received in response to the first value and the second value being different; and
    transmitting the second acknowledgement to the network.

3. The method of claim 1, wherein the acknowledgement retransmission request is one of multiple acknowledgement retransmission requests associated with multiple hybrid automatic repeat request processes included in the signal.

4. An apparatus for wireless communication by a user equipment (UE), comprising:
    a processor;
    memory coupled to the processor; and
    instructions stored in the memory and operable, when executed by the processor, to cause the apparatus to:
        receive a transport block (TB) of data from a network;
        decode the TB of data, wherein the TB of data has a corresponding new data indicator having a first value;
        transmit to the network a first acknowledgement based on a result of the decoding;
        receive a signal from the network that includes an acknowledgement retransmission request and a TB indication that indicates a TB of data to which the acknowledgement retransmission request relates, wherein the TB indication corresponds to a new data indicator having a second value;
        determine a second acknowledgement based on the acknowledgement retransmission request and the TB indication, wherein to determine the second acknowledgment the instructions are operable to cause the apparatus to:
compare the first value and the second value,
repeat the first acknowledgement as the second acknowledgement in response to the first value and the second value being the same, and
set the second acknowledgement to a negative acknowledgement in response to the first value and the second value being different; and
transmit the second acknowledgement to the network.

5. An apparatus for wireless communication by a user equipment (UE), comprising:
a processor;
memory coupled to the processor; and
instructions stored in the memory and operable, when executed by the processor, to cause the apparatus to:
receive a transport block (TB) of data from a network;
decode the TB of data, wherein the TB of data has a corresponding new data indicator having a first value;
transmit to the network a first acknowledgement based on a result of the decoding;
receive a signal from the network that includes an acknowledgement retransmission request and a TB indication that indicates a TB of data to which the acknowledgement retransmission request relates, wherein the TB indication corresponds to a new data indicator having a second value;
determine a second acknowledgement based on the acknowledgement retransmission request and the TB indication, wherein to determine the second acknowledgement the instructions are operable to cause the apparatus to:
compare the first value and the second value; and
set the second acknowledgement to an indication that a grant of data corresponding to the TB indication was not received in response to the first value and the second value being different; and
transmit the second acknowledgement to the network.

6. The apparatus of claim 4, wherein the acknowledgement retransmission request is one of multiple acknowledgement retransmission requests associated with multiple hybrid automatic repeat request processes included in the signal.

7. The method of claim 2, wherein the acknowledgement retransmission request is one of multiple acknowledgement retransmission requests associated with multiple hybrid automatic repeat request processes included in the signal.

8. The apparatus of claim 5, wherein the acknowledgement retransmission request is one of multiple acknowledgement retransmission requests associated with multiple hybrid automatic repeat request processes included in the signal.

* * * * *